UNITED STATES PATENT OFFICE.

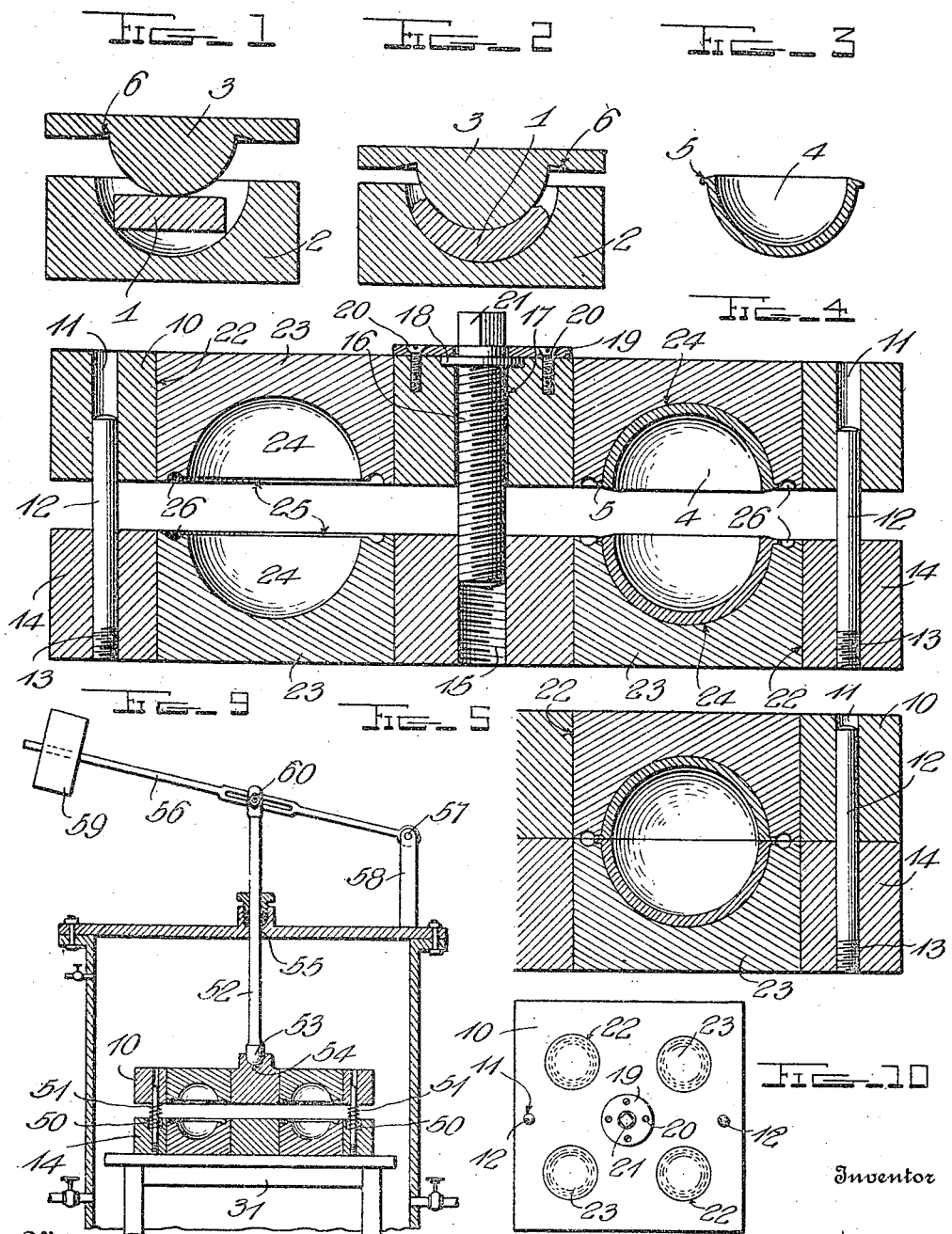

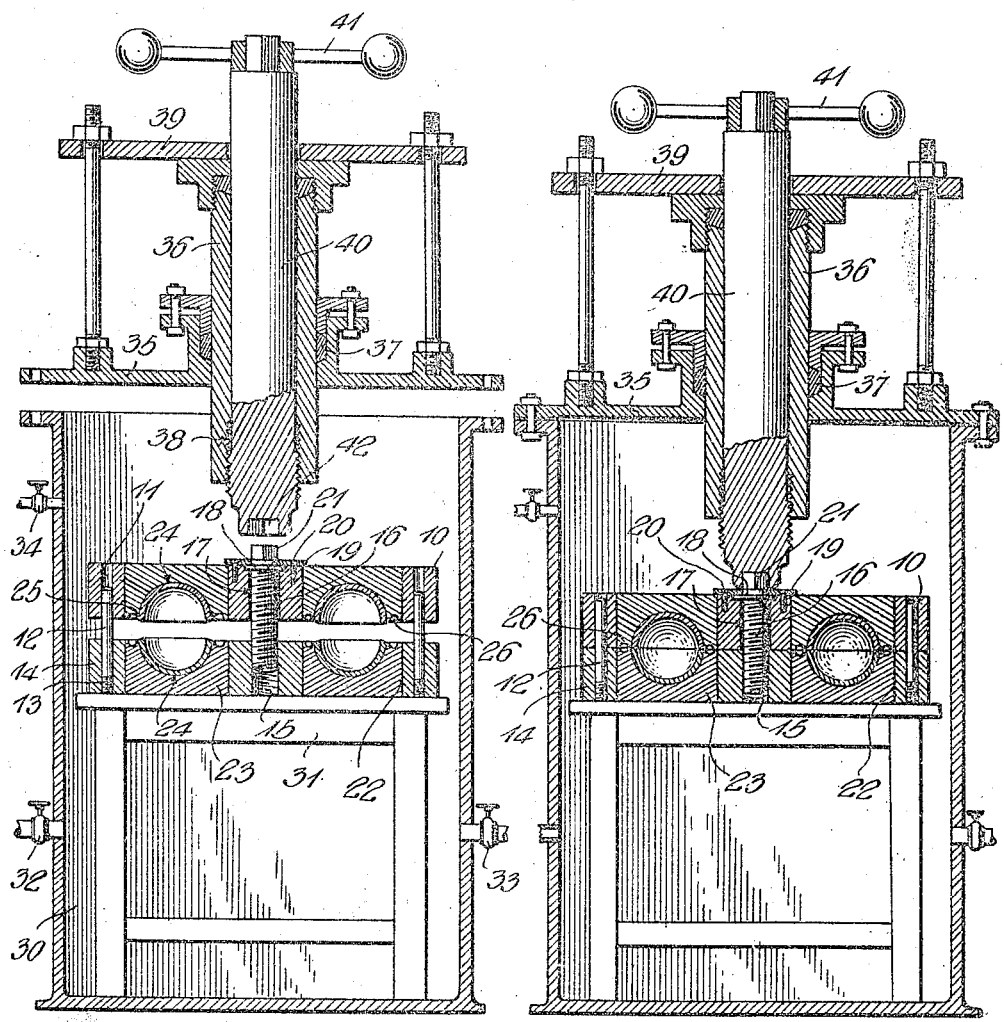
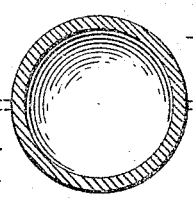

FRED THOMAS ROBERTS, OF TRENTON, NEW JERSEY, ASSIGNOR OF FIFTY ONE ONE-HUNDREDTHS TO RALPH H. ROSENFELD, OF CLEVELAND, OHIO.

METHOD OF MAKING INFLATED RUBBER ARTICLES.

1,146,523.  Specification of Letters Patent.  Patented July 13, 1915.

Application filed October 2, 1913. Serial No. 793,025.

*To all whom it may concern:*

Be it known that I, FRED THOMAS ROBERTS, a citizen of the United States, residing at Trenton, in the county of Mercer and State of New Jersey, have invented certain new and useful Improvements in Methods of Making Inflated Rubber Articles; and I do declare the following to be a full, clear, and exact description of the invention, such as will enable others skilled in the art to which it appertains to make and use the same.

This invention relates to methods of making rubber articles, or those of a composition containing rubber to such an extent that the article may be subjected to the curing or vulcanizing process; and more particularly it relates to the method of uniting the several parts of a hollow rubber article and meanwhile inflating it so that when finished it is subjected to greater internal pressure than the atmospheric pressure on the exterior.

Heretofore it has been the practice in making articles of this character, such as rubber tennis balls and the like, to cement together the sections which are to constitute the ball with a certain amount of expansible substance, usually ammonia powder, in the interior, and a soft rubber button secured at some point on the inner face of the rubber. When such a structure was vulcanized the heat vaporized the ammonia powder or other expansible material and created a sufficient internal pressure to enable proper vulcanization, but, after vulcanization and the cooling of the ball it was necessary to inject fluid under pressure to inflate the ball for use. This was accomplished by piercing the ball through the button with a hollow needle and blowing air through such needle. The ammonia and other expansible substances commonly used within the ball had a detrimental chemical effect on the rubber, rendering it brittle and liable to crack. The sealing, by means of the soft rubber plug, was frequently ineffective, and such balls gradually leaked air and lost their resilience. The constant leakage of the air through the plug seal caused the ball to shrink, which was particularly disadvantageous in tennis balls, for the shrinkage caused the cover to become loose, resulting in the immediate deterioration of the ball in play. This leakage has been so bad that it has become customary for dealers to return to the manufacturers for re-inflation, balls which have remained unsold for various comparatively short periods. The interior rubber plug, moreover, has the effect of throwing the ball out of balance and causing it to return or bounce irregularly when struck or landing directly opposite the plug, which latter feature is noticeable in accurate playing. Occasionally, in the manufacture, the hollow needle was inserted at some other point than directly through the plug and this immediately destroyed the ball.

Heretofore also it has been common to make balls of this kind in parts such as halves, and unite the halves by curing their edges together; but this process produced an internal rib or seam which thickened the wall of the article along the meeting lines between its parts or halves, and in the case of a tennis ball prevented it from rebounding as accurately if it struck a racket or the ground over one of said seams as it would do if it struck the same in another place. In other words, the thickening of the wall at any point on the interior was objectionable, whereas whatever material exuded externally along the meeting lines or seams could be cut off later so that the walls would not be thickened on the exterior. The sealing of the needle hole was also objectionable, because in addition to the fact that the seal was not always reliable or the button was so weak that it often became displaced if the ball were struck a sudden blow, two kinds of rubber were employed, and the cement sealing the hole made the wall a little thicker or denser at this point, and the same objections arose as are pointed out above.

The object of the present invention is to make a hollow inflated article (I will describe it hereinafter with reference to a tennis ball, excepting for the felt or fabric cover applied later) in parts such as halves which are connected along their meeting edges in such a way that the seam or rib produced in the act of curing said edges together is entirely on the exterior of the ball, and therefore it may be ground or cut off later and the wall will be of one thickness and density throughout. This object is carried out by means of an apparatus which forms the subject matter of a companion application filed herewith and bearing Serial Number 793,026 and by the method described below and illustrated in the accompanying drawings wherein—

Figure 1 is a sectional view through a two-part mold such as is employed by my method for making each half of the ball, the members of the mold in this view being shown in position about to be forced toward each other; Fig. 2 is a similar section showing the members after they have been forced toward each other for a considerable distance; Fig. 3 is a sectional view through the partly cured rubber part or half produced by this mold; Fig. 4 is a section through the flask or press used in my improved method, the right side of this view showing two of the halves of Fig. 3 in place in the blocks of said press; and Fig. 5 is a similar section of the right hand portion of Fig. 4 showing the blocks as brought together to unite said halves; Fig. 6 is a vertical sectional view through the apparatus into which the flask is introduced for finishing the curing process, and Fig. 7 is a similar section—the plates of said flask being separated in the former view and brought together in the latter view; Fig. 8 is a sectional detail of the finished part, showing at the sides thereof in dotted lines the flanges which are later trimmed off by any suitable means; Fig. 9 is a sectional view of a slightly modified form of apparatus for handling the flask, and Fig. 10 is a plan view of the flask alone.

According to my improved method a block of rubber material 1 is introduced between a female die 2 and a male die 3 as in Fig. 1, these dies are brought toward each other as shown in Fig. 2, and then they are forced yet farther toward each other so that the part 4 is produced as shown in Fig. 3, the same being herein illustrated as one-half of a spherical tennis ball having a surrounding flange 5 which it will be observed is a little thinner at its outer edge than where it unites with the wall of the part—this difference in its thickness being produced by the shape of the male die at the point 6. The part shown in Fig. 3 is not completely cured, and the object of the present invention is to assemble two of these parts and seal their flanges together while simultaneously introducing compressed air into the interior of the ball being formed.

The flask or press employed in carrying out my improved method is best seen in plan view in Fig. 10 which indicates that it may have cavities for making or pressing four balls at once, although of course there could be a greater or lesser number of said cavities, and in fact the mechanical details are not essential to the method to be described. The upper plate 10 is herein shown as having upright sockets 11 into which slide dowel pins 12 which are screwed as at 13 onto sockets in the lower plate 14 and rise above the upper face of the same, and the lower plate has a threaded central hole 15 engaged by the threads of a screw 16 which is rotatably mounted within a smooth hole 17 in the upper plate 10 and projects below the lower face of this plate as seen. The screw is swiveled in this plate by any suitable means, preferably by having a flange 18 around it overlying the plate and held in place by a face plate or keeper 19 removably mounted on the plate 10 by screws 20, and the upper end of the screw 16 is squared as at 21. It follows that when any suitable key is applied to this squared portion and turned in the proper direction, the plates 10 and 14 will be brought together, and they will be guided in their movements by the dowel pins 12 moving in the sockets 11. Through the two plates are formed apertures 22 which are preferably round as indicated, and in these apertures are secured steel blocks 23, each block having a hemi-spherical cavity 24 which is surrounded by a circumferential channel 25 made a little deeper at its outer edge so as to produce a gutter 26 for a purpose yet to appear. The cavity 24 and channel 25 are of a size and shape to receive the article 4 illustrated in Fig. 3. The members of the flask or press are now brought together by applying a key to the squared portion 21 of the screw 16 and turning the latter in the proper direction, and the entire flask may then be inserted into a suitable vulcanizer and treated with heat (by steam or otherwise) to complete the curing or vulcanization of the rubber in a well known manner.

Referring now to Sheet 2 of the drawings, which illustrates an apparatus for use in carrying out the method of this application, the numeral 30 designates a tank or a chamber of good size, shown as containing a table or other support 31 on which the flask may lie. Through the walls of this tank are steam inlet and air inlet pipes 32 and 33 controlled by suitable valves, and an outlet pipe 34 also suitably controlled. The cover 35 for the tank or chamber 30 has fixed through it a tubular guide 36, preferably surrounded by packing 37, and the guide is internally threaded as at 38 at its lower end while its upper end may be held rigidly upon the cover by means of a yoke 39. Mounted throughout the length of the guide is a key 40 having a threaded lower end engaging the threads 38 and any suitable form of handle 41 at its upper end, and the lower extremity of this key has a socket 42 which is squared for the reception of the squared upper end 21 of the screw 16.

With an apparatus as thus constructed, the carrying out of my method is as follows, after the parts 4 shown in Fig. 3 have been made: Two of said parts in their semi-cured condition are placed in the cavities 24 of two mating blocks 23 when the plates 10 and 14 of the flask stand remote from each other; and if said plates have several pairs of said blocks, several tennis balls can be made simultaneously. The cover 35 of the tank or chamber 30 is then removed and the open flask placed on the table or support 31, after which the cover is restored and the key screwed down by its handle 41 until its socket 42 engages the squared upper end 21 of the screw 16. The pipes 32 and 34 are now closed, the air pipe 33 opened, and air under pressure is admitted to the interior of the tank, whence it of course passes into the cup-shaped parts 4 held in the flask. The handle 41 is now manipulated to turn the key and the screw 16, and the threads of the latter cause the upper plate to move downward until the blocks 23 come into contact with each other. This brings the edges of the walls of the parts 4 into contact and incloses and retains air within the ball being formed. It also compresses the projecting flanges 5 against each other, the surplus material being pressed outward into the channel 25 and finally even upward and downward into the gutters 26 which are formed in the upper and lower channels as above described. But none of the surplus material in the flanges will be pressed into the interior of the spherical article thus being made, because said article contains air under pressure and the inner edges of the flanges— that portion where they unite with the walls of the article—are pressed into contact and united with each other so that the internal air pressure is maintained. The air pipe 33 is now closed, the outlet 34 opened, and steam admitted at 32 to complete the curing of the rubber. The steam is then cut off and the flask taken out of the tank and the articles out of the flask, and finally the external flange which appears in dotted lines in Fig. 8 is trimmed off with a suitable knife or ground off by a suitable tool or machine. Thus it will be seen that a ball is produced the wall of which is of uniform thickness and density throughout and which will have no ridge on its interior or exterior where the seam occurs between its two members. This results from the fact that said members are pressed firmly together while they are in a semi-cured state, within a chamber which is filled with air under considerable pressure, and the pressure is not lowered until the members have been united air-tight.

In the modified form of the apparatus shown in Fig. 9, the central screw 16 and the threads 15 of the lower plate are omitted, and the dowel-pin sockets in this plate are surrounded by recesses 50 within which rest the lower ends of coiled springs 51 that surround the dowel pins as shown. In place of the screw and key for forcing the two members 10 and 14 together, I here employ a plunger 52 having a ball 53 at its lower end engaged with a socket 54 in the upper plate as shown, the plunger moving through a packed opening 55 in the cover plate of the chamber; and instead of the handle 41 shown in Figs. 6 and 7 I may employ a lever 56 pivoted at one end at 57 to a standard 58 rising from the cover and having a weight 59 at its other end, the lever being connected at 60 between its ends with said plunger. After the press has been placed on the stand or table within the tank or chamber, its plates being normally separated by the springs 51, the cover is put in place and the ball 53 at the lower end of the plunger is entered into the socket 54. The weight 59 will now depress the upper member against the tension of the springs 51 and will cause the two plates to be brought together so that the operation above described is carried out. This, however, is but another apparatus for carrying out the general idea set forth, and in the present application I do not wish to be limited to the apparatus employed.

I have spoken throughout this specification of the use of air for inflating the balls or other hollow articles, but reserve the right to employ any preferred fluid, and the same may be supplied to the tank in hot or cold state.

It has been convenient to describe the process with particular reference to balls which are permanently inflated, and such adaptation of the invention is an important one, but the process is applicable to various other forms of hollow articles, and it is obvious that it may be employed where the inflation is only temporary and is used to secure a more effective vulcanization of the surface and welding of the seams during vulcanization. After the article is produced by my process the internal air pressure may be released by removing a section of the article whenever the use of the articles demands a hollow un-inflated bulb or structure of any sort.

It should be noted that, by my system of supplying air pressure, sufficient pressure may be caused in the interior of the article to effectively compress the rubber against the wall of the mold during vulcanization and to effectively weld the seam, and to stretch or distend the article when released from the mold, this distention being particularly important in playing balls to give them the desired resilience or "liveliness."

I have described and illustrated the use of steam for completing the curing process within the tank, but reserve the right to employ any suitable means or method which may be carried out within a closed chamber where the article being cured can be subjected to pressure. In fact, I do not wish to be limited at all to the apparatus employed for carrying out the method set forth in this specification, as any suitable apparatus may be used for homogeneously uniting the meeting edges of the walls of two or more articles under pressure so as to make a hollow and inflated product whose wall throughout will be of one thickness and equal density.

Hollow articles of the character of those produced by this process are shown, described and claimed in my application No. 879,556, filed December 29, 1914.

What is claimed as new is:

1. The herein described method of making hollow rubber articles which consists in first forming them in cup-shaped parts whereof each has an outwardly projecting flange around its open mouth, then bringing said parts together edge to edge in a chamber wherein they are subjected to compressed air, then pressing said flanges against each other and meanwhile subjecting them to the curing process, and finally trimming off the flanges.

2. The herein described method of making inflated rubber balls which consists in first forming the same in cup-shaped halves whereof each has around its mouth a radially projecting flange thinner at its outer edge than where it unites with the body of the half, then bringing the halves together edge to edge in a chamber wherein they are subjected to compressed air internally, then pressing the edges against each other and the flanges into contact with each other and meanwhile subjecting them to the curing process while the air pressure is maintained in the ball, then reducing the air pressure in the chamber and removing the balls from the mold, and finally cutting off the surrounding flanges.

3. The herein described method of making hollow rubber articles which consists in first forming the articles in cup-shaped parts and in a semi-cured condition, then placing said parts in a chamber wherein they are subjected internally to compressed air and bringing them together edge to edge, then withdrawing the pressure from the chamber outside the parts, and then concluding the curing process while the internal pressure is maintained.

4. The herein described method of making hollow rubber articles which consists of forming them in cup-shaped parts, then uniting said parts together edge to edge in a chamber containing an enveloping body of compressed air, then subjecting the parts to the curing process.

5. The herein described method of making inflated rubber balls which consists in first placing two cup-shaped halves in cavities in a pair of blocks, then bringing the blocks together in a chamber wherein they are subjected to compressed air internally, then pressing the edges of the halves against and into contact with each other, then reducing the external air pressure and subjecting the articles to the curing process while the air pressure is maintained in the articles, then removing and separating the blocks, and finally removing the balls.

6. The method of making inflated hollow articles consisting of making the article in parts, uniting the parts within an enveloping fluid under pressure, and removing the article from the enveloping fluid.

7. The method of making inflated rubber articles consisting in making the article in concave parts, bringing such parts together edge to edge with their concavities facing each other within an enveloping fluid under pressure and after the meeting edges have adhered relieving the article from the external pressure.

8. The method of making hollow rubber articles consisting in submitting such article in an unclosed condition to an enveloping fluid under pressure, closing it while under such pressure, and thereafter vulcanizing it while the pressure is maintained within it.

9. The method of making inflated rubber articles consisting in forming the articles in parts and semi-curing them, then bringing said parts together edge to edge in a chamber wherein they are subjected to compressed fluid and then externally holding them in this condition and removing them from the chamber and subjecting them to heat while so held.

10. The method of making inflated articles of material impervious to ordinary air, consisting in forming the articles in parts and bringing said parts together edge to edge within an atmosphere under pressure, and holding said parts in such condition, removing them from such atmosphere and submitting them to heat while the pressure is maintained within the article.

11. The method of making inflated articles of material impervious to ordinary air consisting of first submitting the article in a semi-cured condition and unclosed to a surrounding atmosphere under pressure, closing said article while under such pressure, relieving the pressure on the outside of the article while holding the article closed, and completing the curing of the article by heat while it is in such closed condition.

12. The method of making inflated hollow articles consisting in submitting them in an unclosed condition to an enveloping fluid under pressure while confining them externally by walls limiting the inflation and closing them while in such fluid.

13. The method of making inflated rubber balls consisting in forming hemispheres of rubber, partially curing the same, placing such hemispheres with their diametric edges opposite each other in an atmosphere under pressure, bringing the edges together in such atmosphere, holding them in this position, then relieving the atmospheric pressure on the outside of the ball and removing the ball with its entrained atmosphere under pressure to a suitable apparatus where the two halves are vulcanized together, and thereafter removing from the outside of the ball the external fin occurring where the halves join.

14. The method of making inflated articles impervious to ordinary air consisting in causing an enveloping air pressure both outside of and within the article while it is in an unclosed condition, then closing it upon such air so as to retain the air pressure within it without the necessity of pressure producing chemicals, then relieving the air pressure on the outside of the closed article and then treating the closed article to cause a secure junction where closed.

15. The method of making inflated rubber articles consisting of making the article in semi-cured parts, bringing such parts together within an enveloping atmosphere of air under pressure, holding the parts together, thereby confining the compressed air within the article and in this condition vulcanizing the article causing it to have the original air under pressure when completed.

16. The herein described method of sealing compressed air within a hollow rubber article, consisting in subjecting the article in an unclosed condition and a condition adapted for curing to an enveloping atmosphere of air under pressure, then closing the article within such atmosphere to entrap compressed air within it, continuing to hold the article closed with such air entrapped, and curing the article while so held.

17. The method of making inflated rubber articles consisting in forming the articles in parts, bringing such parts together in an enveloping body of fluid under pressure and vulcanizing the article while the same fluid is confined within it.

18. The method of making inflated rubber articles consisting in forming the article in parts, bringing such parts together within a chamber to which compressed air is supplied from the outside, whereby such air is entrapped within the article, and vulcanizing the article while the same air is confined within it.

19. The process of manufacturing rubber balls consisting in molding hollow hemispherical sections, partially curing said hollow hemispherical sections, bringing the edges of two such hollow hemispherical sections into contact and uniting them within a fluid body under pressure, continuing to hold them united, and finally vulcanizing the sphere thus formed and so held.

In testimony whereof I have hereunto set my hand in presence of two subscribing witnesses.

FRED THOMAS ROBERTS.

Witnesses:
J. RALPH HOGE,
J. A. GRIESBAUER.